UNITED STATES PATENT OFFICE.

HENRY WESSLING, OF HAYS STATION, PENNSYLVANIA.

REFRACTORY BRICK.

1,088,756. Specification of Letters Patent. Patented Mar. 3, 1914.

No Drawing. Application filed April 2, 1912. Serial No. 688,077.

*To all whom it may concern:*

Be it known that I, HENRY WESSLING, a citizen of the United States, residing at Hays Station, in the county of Allegheny and State of Pennsylvania, have invented a new and useful Improvement in Refractory Bricks, of which improvement the following is a specification.

My invention relates to refractory material of brick and particularly to that class of fire brick known as silica brick.

The object of the invention is to produce a brick capable of withstanding the highest possible industrial temperature without liability of disintegration.

The usual fire brick when formed of silica presents a somewhat roughened or granulated surface and the present invention has for its object to produce a brick having all the qualities of the highest grade silica brick with a smooth surface.

In producing the brick the silica is of the highest grade of purity, or substantially pure silica, and is reduced to a comparatively coarse powder and is then bonded by adding thereto finely pulverized soapstone. The manufacture of this brick and the proportions of the materials entering into the manufacture thereof are the subject-matter of my co-pending application and need not be further described herein. After the brick has been thoroughly dried it is immersed in a solution of water and finely pulverized silica, this solution being prepared about as follows: Substantially pure silica is ground to an impalpable powder and is then mixed with sufficient water to form a liquid paste, the silica being held in suspension in the water. The brick is then immersed in this bath, whereby finely divided silica is deposited on the surfaces thereof, dried and burned in the usual manner. The bricks present a comparatively smooth surface.

Having described my invention, what I claim and desire to secure by Letters Patent is:

1. As a new article of manufacture a refractory brick composed of particles of silica bonded by soapstone and having a smooth surface of vitrified silica formed by immersing the brick into a bath of powdered silica and water before drying and burning the same.

2. The method of producing refractory brick which consists in reducing silica to a fine state, bonding the same with a mixture of pulverized soapstone and water, molding the material thus produced into shape and permitting the same to dry, immersing the dried brick in a solution of finely pulverized silica and water, and subsequently burning the brick.

In testimony whereof, I have hereunto signed my name in the presence of two subscribing witnesses.

HENRY WESSLING.

In the presence of—
CLARENCE A. WILLIAMS,
JOHN H. ROMY.